United States Patent

Houston

[11] Patent Number: 5,312,469
[45] Date of Patent: May 17, 1994

[54] CENTRIFUGING WITH PROTECTED FIBERFORMING CONES

[75] Inventor: Robert L. Houston, Newark, Ohio

[73] Assignee: Owens-Corning Fiberglas Technology Inc., Summit, Ill.

[21] Appl. No.: 857,535

[22] Filed: Mar. 25, 1992

[51] Int. Cl.$^5$ .............................. C03B 37/04
[52] U.S. Cl. .............................. 65/6; 65/12; 65/14; 264/8; 425/8
[58] Field of Search .............. 65/6, 8, 12, 14, 15; 264/8; 425/8

[56] References Cited

U.S. PATENT DOCUMENTS

| | | | |
|---|---|---|---|
| 2,931,062 | 4/1960 | Leaman | 65/1 X |
| 2,972,169 | 2/1961 | Stalego | |
| 2,984,864 | 5/1961 | Levecque et al. | 65/8 |
| 3,031,717 | 5/1962 | Kevecque et al. | 65/15 |
| 3,084,380 | 4/1963 | Levecque et al. | 65/6 X |
| 3,245,768 | 4/1966 | Simmers | 65/15 |
| 3,257,183 | 6/1966 | Slayter et al. | 65/15 X |
| 3,372,014 | 3/1968 | Garrison | 65/15 X |
| 3,644,108 | 2/1972 | Russell | 65/8 |
| 3,649,232 | 3/1972 | Battigelli | 65/6 |
| 3,928,009 | 12/1975 | Perry | 65/14 |
| 4,058,386 | 11/1977 | Faulkner et al. | 65/6 |
| 4,670,034 | 6/1987 | Goodridge et al. | 65/6 X |

Primary Examiner—Robert L. Lindsay
Attorney, Agent, or Firm—Ted C. Gillespie

[57] ABSTRACT

A method and apparatus for centrifuging fibers from molten material comprises a spinner having a peripheral wall comprised of an inner layer and an outer layer, a plurality of orifices extending through the inner layer for the passage of molten material therethrough, and a plurality of cavities extending through the outer layer, the cavities generally corresponding to the orifices, the cavities having being sufficiently large so that a) fiber forming cones form where the orifices join the cavities and b) the fibers formed from the cones can exit the cavities without contacting the sides of the cavities.

22 Claims, 4 Drawing Sheets

CENTRIFUGING WITH PROTECTED FIBERFORMING CONES

TECHNICAL FIELD

This invention relates to the production of fibers from molten material. More particularly, this invention relates to centrifuging molten material into fibers, where the centrifuging process creates fiberforming cones which are drawn out into fibers.

BACKGROUND ART

A common prior art method of forming glass fibers for use in insulation products, is the use of a rotary process. Molten material, such as molten glass, is forced through the orifices in the peripheral wall of a centrifuge, or spinner, to create streams of molten glass. As the molten glass is discharged from the orifices, the molten glass forms a tiny fiberforming cone in which the molten glass stream narrows from the width of the orifice down to a much narrower width of a primary fiber.

In a typical mineral fiber centrifuging process the orifices of the spinner pass completely through the spinner peripheral wall, and this positions the fiberforming cones on the exterior of the spinner peripheral wall. Usually, these processes require a flow of hot gases along the spinner peripheral wall in order to maintain the primary mineral fiber in a plastic, attenuable condition for the final drawing out or attenuation into the fiber product. Typically, there is a flow of hot gases provided by an exterior heat source, such as a gas burner, although, an burner or a combination of an internal burner and an external burner are also commonly used. This requirement for a hot environment potentially creates detrimental environmental effects and potentially degrades the mineral fiber product. It would be advantageous to be able to eliminate the requirement for an external heat source in a centrifuging process.

The problem with eliminating the external heating means is that the windage or relative air flow created by the rotation of the spinner peripheral wall tends to cool the fiberforming cone and primary fiber so rapidly that the fiber hardens or becomes too viscous prior to complete attenuation into the desired fiber diameter. A typical desirable fiber diameter for glass fibers, for example, is approximately 5 microns. It has been the experience of past attempts at removing the external heating sources that the cooling occurs so rapidly that only unacceptably large fibers can be created.

In a typical glass fiber forming process the spinner must be maintained at a specific, high temperature to keep the molten glass at a low enough viscosity to ensure that the emitted glass stream can be attenuated into a finer fiber. At these temperatures the molten glass is highly corrosive to most metals. Metallurgy used for these spinners suitable for withstanding contact with the molten glass lacks the tensile strength one would prefer to have for spinner construction. Therefore, it would be desirable to be able to eliminate the need to keep the spinner so hot. Also, it would be desirable to eliminate contact between the molten glass or other material and the spinner. This would enable the use of stronger metals for the spinner.

DISCLOSURE OF THE INVENTION

A new method and apparatus for centrifuging fibers from molten material has been developed to enable the elimination of the requirement of external heating of the boundary layer along the spinner peripheral wall. This is accomplished by providing a spinner peripheral wall having an inner layer and an outer layer, and having the orifices pass through the inner layer and empty out into cavities which are larger in cross-sectional area than the orifices. A fiberforming cone is formed where the orifices join the corresponding cavities, and a primary fiber is produced. The primary fiber travels along the length of the cavity and reaches the exterior of the spinner peripheral wall and is then drawn off to form the completed fiber. Because this invention removes the interaction of the blower with the flame/hot gas boundary layer, considerable latitude can be exercised in the design of the external blowing environment free from any consideration of disruption of the gas boundary layer. Therefore, a variety of external fiber attenuation and treatment means can be employed. For example, fluid, such as gases, can be used to further attenuate the fibers. Also, fluids such as liquids, can be applied to the fiber to produce fibers having specifically desired characteristics. A variety of schemes could be used on the outside of the spinner through various bore designs to entangle and shorten the fiber to make it wool-like. Because the outside temperature of the spinner will tend to be somewhat cooler due to the cooling action of rotation, the operating speed capability of the spinner, and the spinner life, will be dramatically improved.

The spinner outer layer can be created from a material different from the inner layer. For example, the outer layer can be formed from a base metal, and can be operated at a relatively cool temperature. During operation of the spinner, the molten material and the subsequently formed fiber should not come into contact with the outer layer. The inner layer does come into contact with the molten material and, consequently, may need to be made from precious metals or other material resistant to corrosion by the molten material at the high temperatures required to keep the material molten. Therefore, the inner layer can be tailored for corrosion resistance without worrying about strength, and the outer layer tailored for strength without concern for corrosion issues.

According to this invention, there is provided a method for centrifuging fibers from molten material comprising rotating a spinner having a peripheral wall comprised of an inner layer and an outer layer, supplying molten material to the spinner, passing the molten material through orifices in the inner layer, passing the molten material through cavities extending through the outer layer, the cavities generally corresponding to the orifices, forming fiberforming cones where the orifices join the cavities, and forming fibers from the cones without contact between the material and the sides of the cavities.

In a specific embodiment of the invention the fibers are maintained in a plastic, attenuable condition while they are within the cavities.

In a specific embodiment of the invention, the exterior of the outer layer is maintained at a temperature below the softening point of the material.

In yet another specific embodiment of the invention, the temperature differential between the exterior of the outer wall and the interior of the inner wall is at least 600° F.

In yet another specific embodiment of the invention, mineral fibers are centrifuged from molten mineral material. Preferably, the mineral fibers are formed in the absence of a heat source external of the spinner.

According to this invention, there is also provided apparatus for centrifuging fibers from molten material comprising a spinner having a peripheral wall comprised of an inner layer and an outer layer, a plurality of orifices extending through the inner layer for the passage of molten material therethrough, and a plurality of cavities extending through the outer layer, the cavities generally corresponding to the orifices, the cavities having being sufficiently large so that a) fiber forming cones form where the orifices join the cavities and b) the fibers formed from the cones can exit the cavities without contacting the sides of the cavities.

In a specific embodiment of the invention, the length of the cavities is sufficient to prevent substantial convection cooling of the fiberforming cones.

In yet another specific embodiment of the invention, the inner layer is made from a different material from that of the outer layer. Preferably the inner layer is thermally insulated from the outer layer.

In another specific embodiment of the invention, the inner layer is glass corrosion resistant.

In yet another specific embodiment of the invention, each cavity corresponds to a plurality of orifices.

In one particular embodiment of the invention, the orifices and cavities are generally circular in crosssection, and the ratio of the diameter of the cavities to the diameter of the orifices is within the range of from about 12:1 to about 2:1.

In a preferred embodiment of the invention, the ratio of the length of the cavities to the length of the orifices is within the range of from about 12:1 to about 2:1.

BEST MODE OF CARRYING OUT THE INVENTION

The invention will be described with reference to the manufacture of glass fibers from molten glass, although it is to be understood that the method and apparatus of the invention could be used to make fibers from other mineral material, such as rock, slag and basalt, and from other materials which are non-mineral, such as by making polymer fibers from molten polymeric material.

Figure 1:
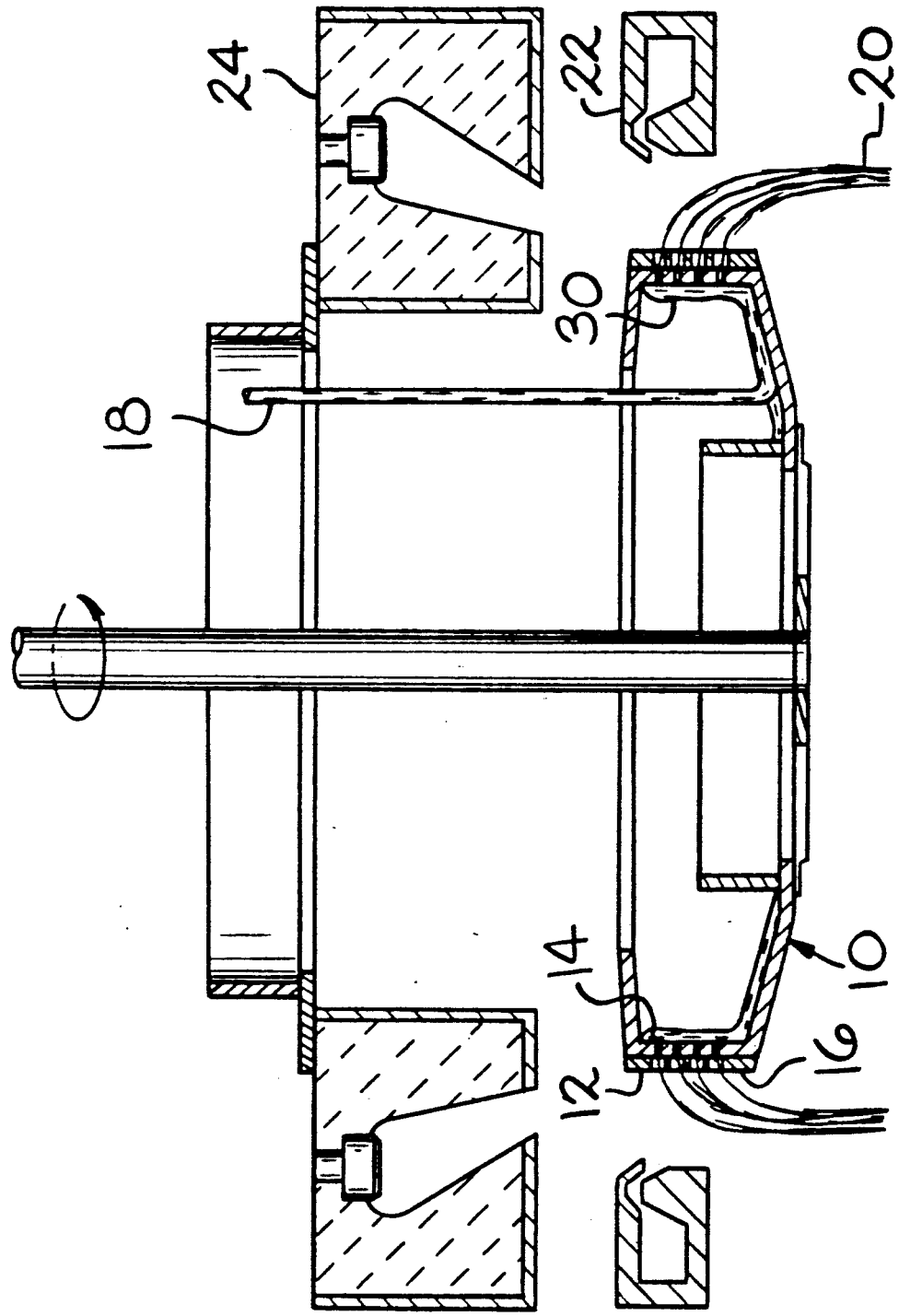
FIG. 1 is a schematic view in elevation of a cross-section of a fiberizer for centrifuging molten material according to the principles of the invention.

As shown in FIG. 1, spinner 10 is mounted for rotation and has spinner peripheral wall 12 which is comprised of inner layer 14 and outer layer 16. Molten glass 18 is supplied to the spinner, and the glass flows through the spinner peripheral wall to form glass fibers 20. The glass fibers can be further attenuated by the action of annular blower 22. Optionally, an external heat source, such as annular burner 24, can be positioned to heat the glass fibers during the attenuation process. Preferably, the fiberization takes place in the absence of external heat sources.

Figure 3:
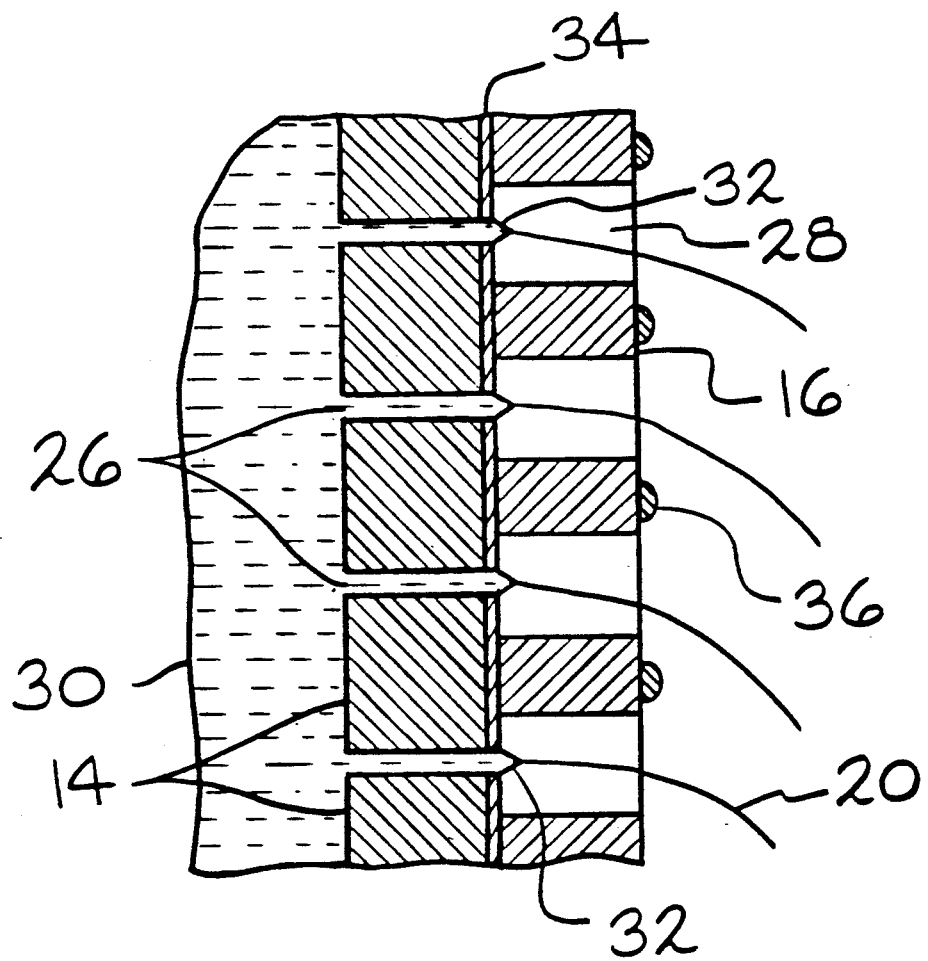
FIG. 3 is a schematic cross-sectional plan view of the spinner peripheral wall of FIG. 1, illustrating the inner and outer layers.

As shown in FIG. 3, the spinner inner layer is adapted with orifices 26 through which the molten glass passes. Each of the orifices empties out or is joined to a cavity, such as cavities 28, positioned in the spinner outer layer. In operation, molten glass flows upwardly on the interior of the spinner peripheral wall, forming glass head 30. The molten glass flows through the orifices and forms fiberforming cones 32. The fiberforming cones are positioned where the orifice joins the cavity. Emanating from the fiberforming cone is a molten, or plastic and attenuable glass stream which eventually solidifies to form the glass fiber.

As can be seen, the width or diameter of the cavity is sufficiently large, and the length of the cavity is sufficiently long that the glass fiber does not impinge upon the sides of the cavity.

Figure 5:
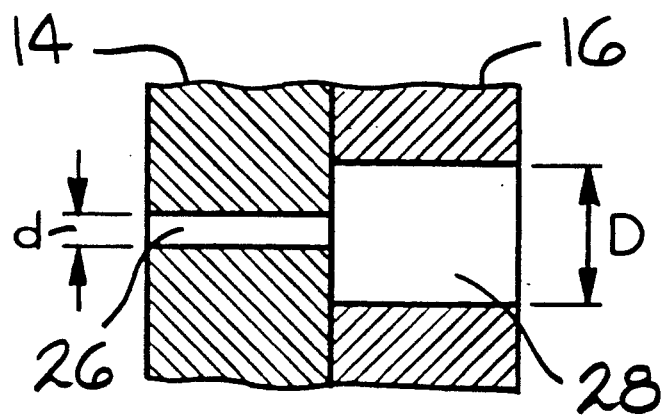
FIG. 5 is a schematic cross-sectional plan view of a portion of a spinner inner and outer wall, illustrating the diameters of the cavity and the orifice.

Neither the orifices nor the cavities need be circular in cross-section. In the event that the orifices and cavities are generally circular in cross-section, the ratio of the diameter D of the cavity and the diameter d of the orifice, as shown in FIG. 5, is preferably within the range of from about 12:1 to about 2:1. Also, the ratio of the length of the cavities to the length of the orifices is preferably within the range of from about 12:1 to about 2:1.

As shown, the fiberforming cones are embedded or buried rather deeply within the cavities. The length of the cavity must be sufficient to prevent substantial convection cooling of the fiberforming cone and the plastic, attenuable glass stream emanating therefrom before the required attenuation can occur. Otherwise, the fibers will be too fat. The purpose of the cavity is to keep the fiberforming cones from freezing off, and to maintain the fibers in a plastic, attenuable condition long enough for proper attenuation to occur. This is true even if the temperature of the exterior of the spinner outer layer is relatively cool, and even if relatively cool gases are passing across the face or exterior of the spinner.

Insulation layer 34 can be positioned between the inner and outer spinner layers in order to enable the layers to assume different temperatures. The insulation layer can be any means suitable, such as an air gap, or a ceramic material. With the insulation layer in place, the exterior of the outer layer can be maintained at a temperature below the softening point of the glass. In fact, the temperature differential between the exterior of the outer wall and the interior of the inner wall can be significant. In one embodiment of the invention, the temperature differential between the exterior of the outer wall and the interior of the inner wall is at least 600° F., although even a temperature differential of 50° F. to 100° F. would be of benefit.

It is possible to use different materials for the inner and outer layers. The outer layer needs to be strong to handle the hoop stresses and other dynamic forces associated with a rapidly rotating spinner in a hot environment. The outer layer material need not be glass corrosion resistant, however, because the glass does not touch the outer layer or the walls of the cavities.

The inner layer needs to be glass corrosion resistant, in order to withstand the contact with the molten glass at high temperatures. Typically, these temperatures are approximately 1700° F. to 1800° F. The inner layer for a glass fiber production spinner according to the invention would preferably be made from a nickel-chromium alloy or other suitable alloys, which are well known to those skilled in the art. The inner layer could rely on the strength of the outer layer in order to maintain stability during operation.

As shown in FIG. 3, the exterior of the spinner peripheral wall can be adapted with projections 36 for creating additional turbulence in the air flow passing across the exit of the cavities. The projections can be any suitable element of any appropriate shape to create turbulence. The turbulence could be useful both in creating additional drag force for further attenuation of the glass fiber, and in creating variable drag forces on the fiber just prior to solidification, thereby creating a curly or kinked fiber.

Figure 4:
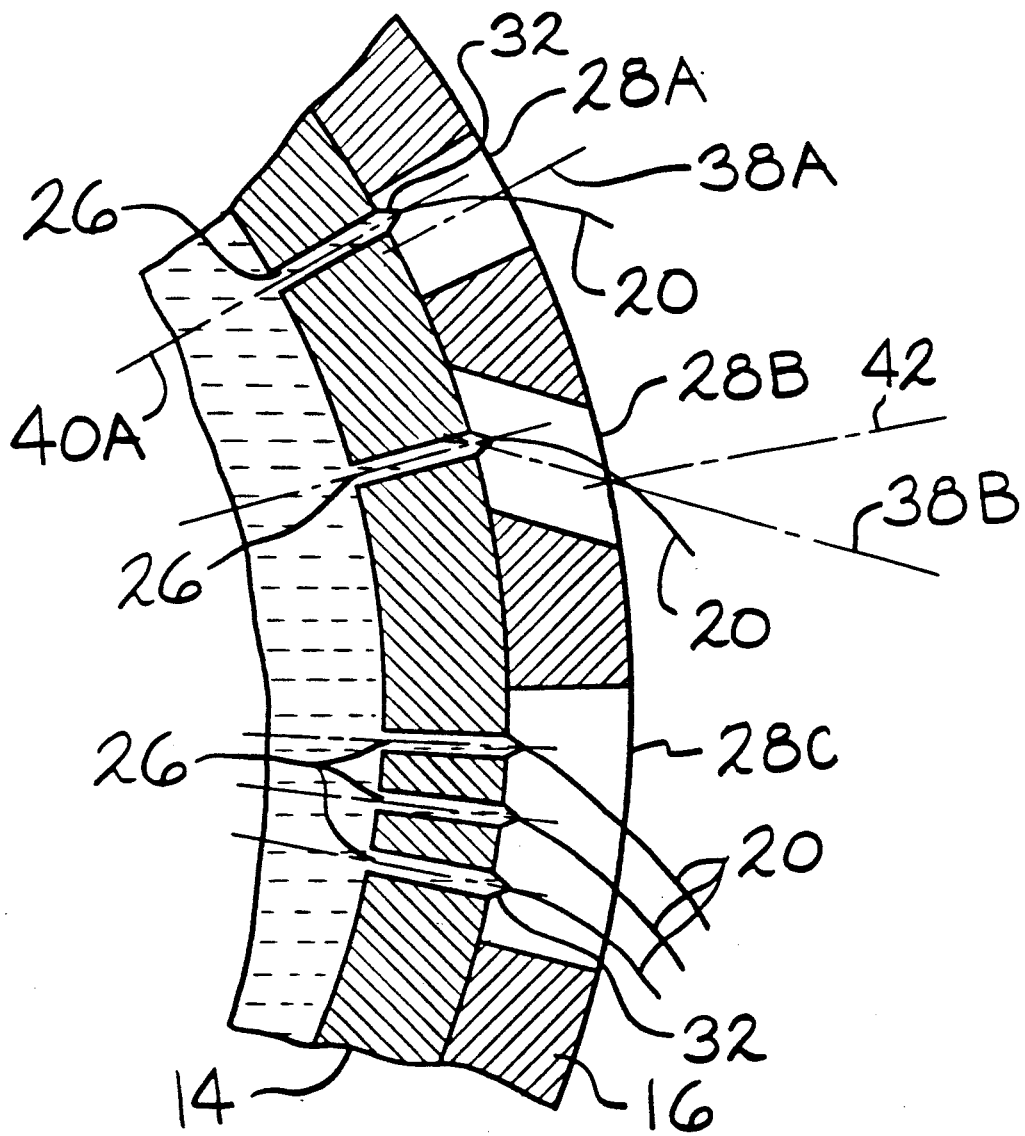
FIG. 4 is a schematic plan view of the inner and outer layers of the spinner peripheral wall, illustrating three different possible orientations or arrangements of the cavities with respect to the orifices.

As shown in FIG. 4, in one variation of the invention cavity 28A has centerline 38A which is angularly offset from centerline 40A of the corresponding orifice. This positions the cavity somewhat rotationally downstream from the orifice so that the fiber emanating from the fiberforming cone will travel on a trajectory or fiber path entirely within the cavity, without impinging upon the walls of cavity 28A.

In another variation of the invention, cavity 28B is mounted at an angle so that centerline 38B of the cavity is not co-linear with radius 42 of the spinner. This orients the cavity at an angle, rotationally downstream from the orifice, so that the trajectory of the fiber path within the cavity will not cause the fiber to impinge upon the walls of cavity 28B.

In the third variation shown in FIG. 4, cavity 28C is shown associated with three corresponding orifices, all of which have fiberforming cones and produce fibers which travel through cavity 28C to form glass fibers. Therefore, the cavity corresponds to a plurality of orifices. The term "cavities generally corresponding to the orifices" means that each orifice empties out into a cavity, although it is to be understood that a multiple number of orifices can empty out into a single cavity.

Figure 2:
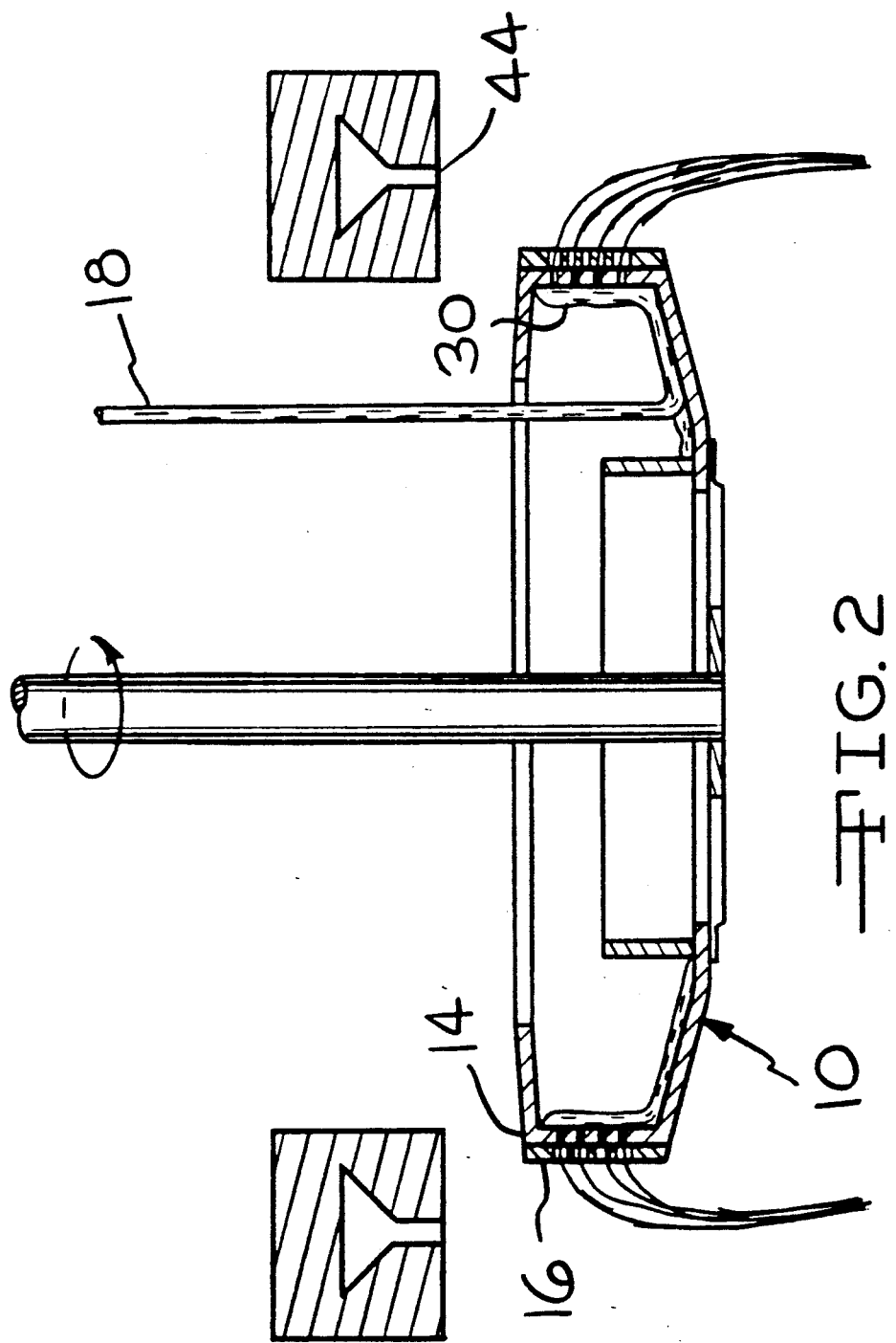
FIG. 2 is a schematic sectional view in elevation of a different embodiment of a fiberizer for centrifuging molten material in the absence of an external heat source.

As shown in FIG. 2, the fiberizer can be operated without an external burner, and can be adapted with an apparatus for supplying a fluid in close proximity to the exterior of the spinner peripheral wall. The means for supplying the fluid can be any suitable means, such as a blower or annular fluid nozzle 44. The fluid nozzle can be adapted to supply gases, such as air or other oxidizing gases, or could also supply reducing gases. Also, the fluid nozzle could be adapted to supply liquids for quenching the glass fibers emanating from the spinner, or liquids for coating the fibers with any material desired. Since the fiberforming cones are buried within the cavities, the fluid can be passed directly along the exterior of the peripheral wall, even if this means cooling the exterior of the outer layer of the peripheral wall to a temperature below the softening point of the material. One of the great advantages of the present invention is that by protecting the fiberforming cones within the cavities, fluid flows of gases and/or liquids can be applied to the fibers as soon as they emanate from the cavities. Thus, the glass fibers will be formed in a more controlled environment than has heretofore been possible.

It will be evident from the foregoing that various modifications can be made to this invention. Such, however, are considered as being within the scope of the invention.

INDUSTRIAL APPLICABILITY

This invention will be found to be useful in making fibers for such uses as thermal and acoustical insulation products.

I claim:

1. The method of centrifuging fibers from molten material comprising rotating a spinner having a peripheral wall comprised of an inner layer and an outer layer, supplying molten material to the spinner, passing the molten material through orifices in the inner layer, passing the molten material through cavities extending through the outer layer, the cavities generally corresponding to the orifices, forming fiberforming cones where the orifices join the cavities, forming fibers from the cones without contact between the material and the sides of the cavities and, intercepting the fibers outside the cavities with relatively cool fluid, the fluid being sufficiently cool to prevent complete attenuation of the fibers in the absence of passing the molten material through the cavities.

2. The method of claim 1 in which the length of the cavity is sufficient to prevent substantial convection cooling of the fiberforming cone and the plastic, attenuable glass stream emanating therefrom before the required attenuation can occur.

3. The method of claim 2 in which the exterior of the outer layer is maintained at a temperature below the softening point of the material.

4. The method of claim 3 in which the temperature differential between the exterior of the outer wall and the interior of the inner wall is at least 600° F.

5. The method of claim 3 comprising passing the fluid along the exterior of the outer layer of the peripheral wall, the fluid having a temperature below the softening point of the material.

6. The method of claim 5 comprising further attenuating the fibers with the fluid.

7. The method of claim 3 comprising placing projections on the exterior of the outer layer, and increasing the turbulence of the fluid with the projections.

8. The method of centrifuging mineral fibers from molten mineral material comprising rotating a spinner having a peripheral wall comprised of an inner layer and an outer layer, supplying molten mineral material to the spinner, passing the molten mineral material through orifices in the inner layer, passing the molten mineral material through cavities extending through the outer layer, the cavities generally corresponding to the orifices, forming fiberforming cones where the orifices join the cavities, forming mineral fibers from the cones without contact between the mineral material and the sides of the cavities, and, intercepting the fibers outside the cavities with relatively cool fluid, the fluid being sufficiently cool to prevent complete attenuation of the fibers in the absence of passing the molten material through the cavities.

9. The method of claim 8 in which the length of the cavity is sufficient to prevent substantial convection cooling of the fiberforming cone and the plastic, attenuable glass stream emanating therefrom before the required attenuation can occur.

10. The method of claim 9 in which the exterior of the outer layer is maintained at a temperature below the softening point of the material.

11. The method of claim 10 in which the mineral fibers are formed in the absence of an external heat source.

12. The method of claim 10 comprising passing the fluid along the exterior of the outer layer of the peripheral wall, the fluid having a temperature below the softening point of the mineral material.

13. Apparatus for centrifuging fibers from molten material comprising a spinner having a peripheral wall comprised of an inner layer and an outer layer, a plurality of orifices extending through the inner layer for the passage of molten material therethrough, and a plurality of cavities extending through the outer layer, the cavities generally corresponding to the orifices, the cavities having sufficient width and length that a) fiber forming cones form where the orifices join the cavities, b) the fibers formed from the cones can exit the cavities without contacting the sides of the cavities, and c) substantial convection cooling of the fiberforming cone, and the plastic, attenuable glass stream emanating therefrom is prevented before the required attenuation can occur.

14. The apparatus of claim 13 in which the centerlines of the cavities are at an angle to a radius of the spinner to accommodate the trajectory of the fiber path within the cavity.

15. The apparatus of claim 13 in which the inner layer is made from a different material from that of the outer layer.

16. The apparatus of claim 15 in which the inner layer is glass corrosion resistant.

17. The apparatus of claim 15 in which the inner layer is thermally insulated from the outer layer.

18. The apparatus of claim 17 in which the temperature differential between the exterior of the outer wall and the interior of the inner wall is at least 600° F.

19. The apparatus of claim 13 in which each cavity corresponds to a plurality of orifices.

20. The apparatus of claim 13 in which the orifices and the cavities are generally circular in crosssection and in which the ratio D:d is within the range of from about 12:1 to about 2:1, where D is the diameter of the cavity and d is the diameter of the orifice.

21. The apparatus of claim 13 in which the ratio of length of the cavities to the length of the orifices is within the range of from about 12:1 to about 2:1.

22. The apparatus of claim 13 in which the centerlines of the cavities are angularly offset from the centerlines of the corresponding orifices to accommodate the trajectory of the fiber path within the cavity.

* * * * *